United States Patent Office 2,824,015
Patented Feb. 18, 1958

2,824,015

PURIFICATION OF ACYLATED POLYPEPTIDE COATING AIDS

John W. Gates, Jr., Rochester, N. Y., assignor to Eastman Kodak Company, Rochester, N. Y., a corporation of New Jersey No Drawing. Application May 27, 1955
Serial No. 511,800

3 Claims. (Cl. 106—135)

This invention relates to a method of removing the impurities from acylated polypeptides which are employed as coating aids in the manufacture of photographic products.

It is often desirable particularly in the photographic industry to apply one or more layers of gelatin to a surface. In applying gelatin coatings it is often desirable to incorporate in the gelatin coating composition a coating aid to improve the properties of that material in the coating operation. Saponin has been commonly employed for that purpose but recently it has been found desirable to incorporate synthetic coating aids included among which are the acylated polypeptides. The use of these materials as coating aids in gelatin coating compositions is described and claimed in Knox and Wright application Ser. No. 383,388, filed September 30, 1953.

Heretofore in the use of these materials in gelatin coating compositions the material has been prepared and the entire resulting mass from that preparation has been added to the gelatin coating composition. Although this practice has been satisfactory in many applications of gelatin coatings, there has been up to now no useful method of purifying these materials and thus their use in some cases demanding high purity has left something to be desired.

It is one object of my invention to provide a method of purifying acylated polypeptide coating aids so as to remove impurities therefrom which might hinder their use in certain critical operations. Another object of my invention is to prepare the purified acylated polypeptides in a form in which they may be readily employed in gelatin compositions. A further object of my invention is to prepare purified acylated polypeptides without any derogatory effect thereon. Other objects of my invention will appear herein.

The above objects are readily accomplished by first forming with the acylated polypeptide a mixture with gelatin such that the resulting composition essentially consists of 25-75% of gelatin and 75-25% of acylated polypeptide based on the gelatin-polypeptide derivative mixture. In usual practice equal parts of the gelatin and polypeptide derivatives result in a mixture which may be conveniently purified. After the mixture of gelatin and acylated polypeptide is prepared it is set by chilling and formed into small size units such as by forcing the set mass through small perforations to form noodles or the like. The only qualification is that the units formed are of sufficient strength to keep their shape upon washing with cold water.

The washing may be carried out to the extent desired depending upon the purity wanted. A washing time of 2 to 4 hours is usually ample to obtain a satisfactorily pure product. The washing and drying of the material can be conveniently carried out by forming layers of the noodled material on a foraminous screen which may be slowly moved along under a water spray, the speed of wash and the length wherein the noodles are sprayed being governed by the desired washing time. After the material has been washed to a sufficient extent it may then remain on the foraminous belt and be passed through a drying chamber in which air of low humidity and elevated temperature may be passed through the gelatin noodles upon the foraminous belt for a sufficient time to cause drying of the noodles. Another method of washing which may be employed is to collect the noodles in a mesh container which may be dipped into water preferably while in motion so that noodles are reduced in their content of salts or other impurities which might be present therein. The washed noodles can if desired be put on screens or nets and allowed to stand exposed to the air particularly of low relative humidity whereby moisture is removed from the noodles or other units. The washed material may be employed in photographic emulsions and is particularly valuable for use in highly sensitive emulsions such as emulsions of the high speed negative type due to its being free of fogging and desensitizing materials and essentially free of inorganic salts such as sodium chloride, sodium sulfate and the like.

The materials which may be purified by my invention are the acylated lower polypeptides particularly those of 1–10 peptide groups which have been acylated with aliphatic acid halides of 8–18 carbon atoms. Some of the materials which may be purified by my procedure are those prepared by methods described in patents such as U. S. Patents Nos. 2,015,912; 2,041,265; 2,113,819 and Br. Patent No. 413,016. Some of the compounds which may be so purified are the reaction products of polypeptides of the types referred to and oleoyl, lauroyl, palmitoyl, myristoyl, capryloyl, pelaragonyl and ricinoleyl chlorides. The reaction is ordinarily carried out in the presence of a base so that the product formed may be a salt of the acylated polypeptide. The following example illustrates my invention:

Example

A solution of 5 lbs. 11 ozs. of bone gelatin and 22 lbs. of water was warmed to 60° C. accompanied by agitation and added thereto was 33 lbs. 13 ozs. of the mass resulting from preparing oleoyl polypeptide in which 16.9% of that material was present, the latter also warmed to 60° C. The mass was stirred for 30 minutes so as to assure thorough mixing of the gelatin and the oleoyl polypeptide and was chilled overnight. A solid gel mass formed. This mass was passed through a perforated plate forming noodles which were washed with water for 3 hours and were dried by passing a current of warm dry air therethrough. The noodles obtained weighed 8 lbs. 13 ozs. The purified oleoyl polypeptide was employed as a coating aid both for photographic emulsions and in other types of aqueous gelatin coating compositions. It was found that the gelatin compositions containing the purified oleoyl polypeptide coated out readily and that the emulsions which had been mixed with this material and coated exhibited no adverse effects from the coating aid which had been purified in accordance with my invention.

Instead of oleoyl polypeptide any one of the other acylated polypeptides as referred to may be purified in a like manner. Ordinarily the polypeptides which are employed in making acylated polypeptides are made up of a mixture of materials of varying numbers of peptide groups in the molecule. Most of these materials, however, have a peptide group content within the range of 1–10 peptide groups.

I claim:

1. A method of refining a water soluble acylated polypeptide, the acyl of which comprises aliphatic acid radicals of 8–18 carbon atoms and the peptide group content of which is within the range of 1–10, the impurities of which include inorganic salts, which comprises incorporating in the acylated polypeptide an aqueous solution of gelatin in the proportion of 75-25% of the former and 25-75% of the latter, based on the solid weight of the mixture, chilling the resulting mixture to form a solid gel mass therefrom, dividing the mass into small units and washing with cold water to substantially reduce the salt content of the acylated polypeptide.

2. A method of refining a water soluble acylated polypeptide, the acyl of which comprises aliphatic acid radicals of 8-18 carbon atoms and the peptide group content of which is within the range of 1-10, the impurities of which include inorganic salts, which comprises mixing with the acylated polypeptide an equal amount of gelatin in aqueous solution, all based on solid weight, chilling the resulting mixture to form a solid gel mass therefrom, dividing the mass into small units and washing with cold water to substantially reduce the salt content of the acylated polypeptide.

3. A method of refining a water soluble oleoyl polypeptide, the peptide group content of which is within the range of 1-10, the impurities of which include inorganic salts, which comprises incorporating into the oleoyl polypeptide, an aqueous solution of gelatin in the proportion of 75-25% of the former and 25-75% of the latter, based on dry weight, chilling the resulting mixture to form a solid gel mass therefrom, dividing the mass into small units and washing with cold water to substantially reduce the salt content of the oleoyl polypeptide.

References Cited in the file of this patent

UNITED STATES PATENTS

| | | |
|---|---|---|
| 2,719,146 | Schwander | Sept. 27, 1955 |
| 2,729,628 | Mann | Jan. 3, 1956 |
| 2,763,639 | Elins et al. | Sept. 18, 1956 |